May 13, 1969

O. B. JOHNSON 3,444,064

METHOD FOR IMPROVING OPERATIONAL STABILITY
OF ELECTROCOATING BATH

Filed Dec. 6, 1966

OLIN B. JOHNSON
INVENTOR.

BY John R. Faulkner
Olin B. Johnson
ATTORNEYS

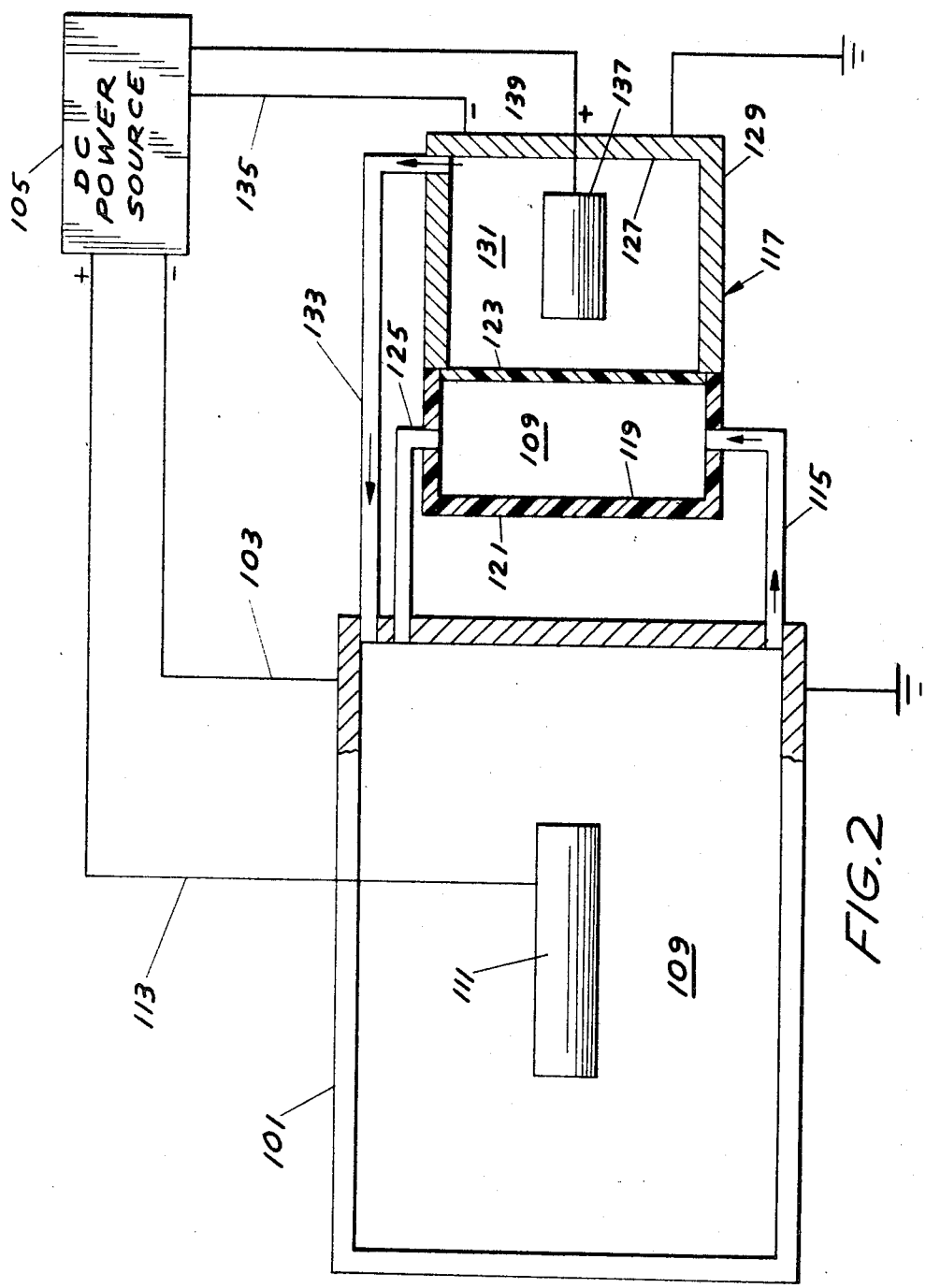

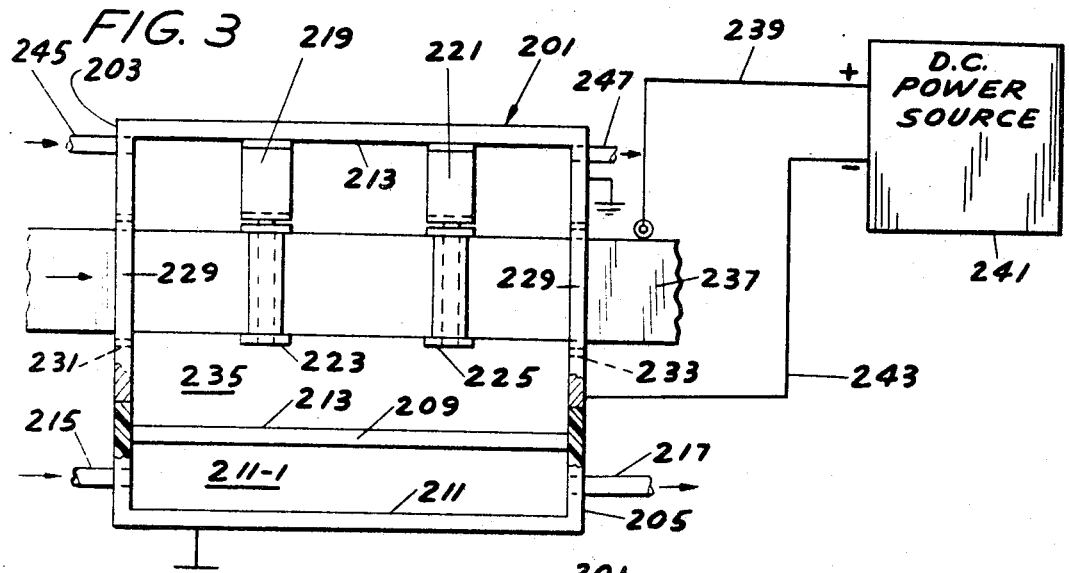
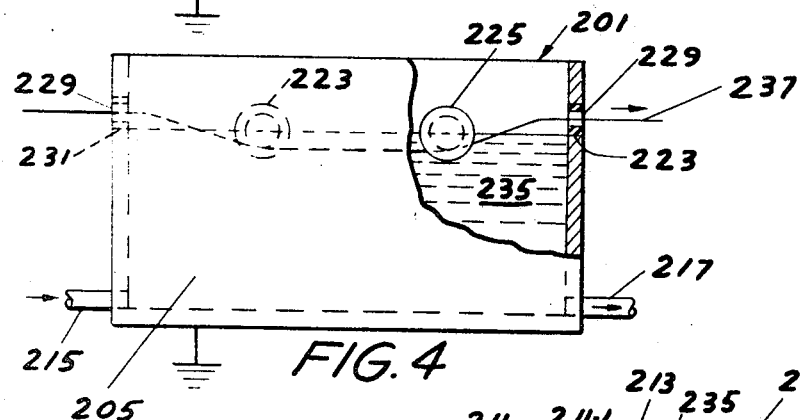
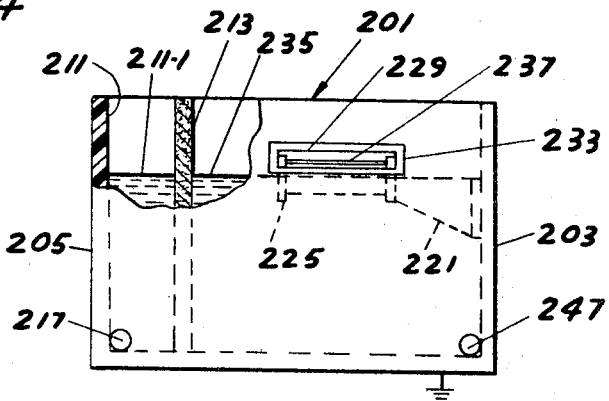
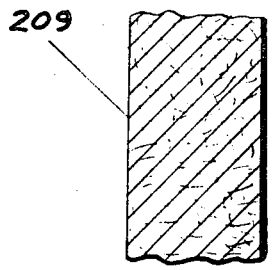

United States Patent Office 3,444,064
Patented May 13, 1969

3,444,064
METHOD FOR IMPROVING OPERATIONAL STABILITY OF ELECTROCOATING BATH
Olin B. Johnson, Livonia, Mich., assignor to Ford Motor Company, Dearborn, Mich., a corporation of Delaware
Filed Dec. 6, 1966, Ser. No. 599,474
Int. Cl. C23b 13/00; B01k 5/02
U.S. Cl. 204—181               6 Claims This invention relates to the art of coating an electrically conductive workpiece in an aqueous bath by electrically induced deposition of an organic coating material having functional groups in its molecular structure which are ionizable in aqueous medium. More particularly, this invention is concerned with a method for maintaining bath stability in a continuous or intermittently continuous electrocoating process of the type herein described which comprises isolating a portion of the aqueous component of the bath from the paint solids therein, bringing said portion into contact with spaced apart electrodes, and maintaining a difference of electrical potential between said electrodes sufficient to effect removal from said portion of electrodepositable ions that accumulate within said bath and to effect evolution of gas therefrom.

The method of this invention is carried out at a difference of potential between the electrodes of the purification cell above the threshold voltage for the resin, preferably above about 20 volts. The threshold voltage, i.e. the difference of potential at which electrically irreversible and/or essentially bath insoluble deposition of the resin is initiated, will vary somewhat with the chemical and physical properties of the resin to be deposited. Ordinarily, this will be above about 5 volts and less than about 20 volts, more commonly below about 10 volts. At voltages above the threshold voltage, an electrically resistant, resin-comprising film forms upon the receiving electrode, the anode in anodic deposition, the current falls rapidly and coating is effectively terminated as the current flow drops to insignificance.

The instant process is useful with either an anodic or a cathodic deposition process. Resins suitable for anodic electrocoating or electropainting are polycarboxylic acid resins which are dispersed in the aqueous coating bath with the aid of a water soluble amino compound, such term herein including water soluble amines and ammonia. A resin suitable for cathodic deposition has in its molecular structure ionizable groups which upon ionization leave ionically positive sites. Examples of such groups are amine and substituted amine groups such as quarternary ammonium groups. Dispersion of such resins is effected by the addition of water-ionizable acidic dispersal assistants, e.g. water soluble carboxylic acids and suitably buffered forms of certain inorganic acids. Formic acid and acetic acid are exemplary of the former and buffered phosphoric acid is exemplary of the latter.

To date anodic deposition has gained primary acceptance in this field and is exemplified by U.S. Patent 3,230,162 to A. E. Gilchrist which patent is herein incorporated by reference. This embodiment of the electrocoating process is used herein for the detailed description of the invention, it being understood that the polarity of the electrodes shown in the drawings are reversible for cathodic deposition embodiments.

During the coating process, the coating material is first deposited upon the more easily coated areas, i.e. those areas of the workpiece about which the electric field is strongest. As these areas are coated with an electrically resistant film, the coating material is then deposited upon the uncovered areas and the areas having thinner coatings. Hence, this coating process tends to be self-leveling.

In industrial electrocoating processes, the coating tank may contain in excess of 10,000 gallons of the aqueous bath and maintenance of bath quality through many turnovers, i.e. complete replacement of coating solids, is essential to economic operation. The initial conductivity of a freshly prepared coating bath can be controlled within limits to provide optimum coating conditions in the given system. However, in anodic deposition, the quantitative use of water soluble amines used to solubilize the acidic resins affect such conductivity and hence the pH of the resultant bath. During continued use of the bath, an increase of electrical conductivity is frequently observed. In many instances, this conductivity increase is accompanied by increasing gas evolution at the anode, higher current consumption, lowered throwing power and formation of unsightly paint films upon curing. This increase in conductivity also results from the accumulation of extraneous materials which ionize in the bath. Such ions are introduced into the coating bath through addition of water, leaching of pigment, entrainment of salts with incoming workpieces, absorption of carbon dioxide from the air, etc. By these methods phosphate ions, sulfate ions, chloride ions and various metal ions are introduced into the bath.

It now has been discovered that bath stability, i.e. constancy of bath composition, is improved by placing the bath between electrodes of opposite polarity and maintaining a difference of electrical potential between such electrodes that is sufficient to effect neutralization of the offending ions at the receiving electrode with resultant deposition or evolution of the reaction product. The term "receiving electrode" refers to electrode of opposite polarity with respect to the charge of a given ion. Some such ions can be removed at voltages below the threshold voltage of the resin and hence can be removed in the presence of the solids without causing the latter to deposit. When this difference of potential is above the threshold voltage, additional contaminants are removed from the bath and the rate of ion removal is accelerated. However, if removal of the accumulated ions is to be effected at voltages above the threshold voltage of the ionized resin employed, the ions must be separated from the coating bath prior to their removal or, a portion of the aqueous component of the bath must be separated from the coating material and the ions removed therefrom.

This process can be carried out within a separate compartment within the coating tank or, preferably, a portion of the bath is continuously removed from the coating tank and passed to a separate cell where ions can be removed continuously. A potential difference of above about 20 volts is advantageously employed. In one embodiment of this invention, the voltage employed in the purification cell is the same voltage used to electrodeposit the coating material. It will be understood that the bath in use can be analyzed to determine the extraneous ions that have accumulated therein since initiation of coating with the bath involved.

The process to which the instant invention is directed together with the method of this invention will be more fully understood from the following detailed description when read in conjunction with the accompanying schematic drawings, wherein:

FIGURE 2 is a schematic plan view of a second embodiment of apparatus which can be used to carry out a second embodiment of this invention wherein a portion of the coating bath is continuously removed from the coating tank, the coating materials separated therefrom, and removal of ions is effected from the aqueous fraction from which the coating material has been removed;

FIGURE 3 is a schematic plan view of a third embodiment of apparatus which can be used for carrying out a third embodiment of this invention wherein a portion of the coating bath is continuously removed from the coating tank, an aqueous portion of the bath is separated and contaminants are removed by a continuous electrode passing through said aqueous portion;

FIGURE 4 is a side view of the separation tank of the apparatus shown in FIGURE 3;

FIGURE 5 is an end view of the separation tank of the apparatus shown in FIGURE 3; and FIGURE 6 is an enlarged view of the separator membrane shown in FIGURES 3 and 5.

EXAMPLE 1

Figure 1:
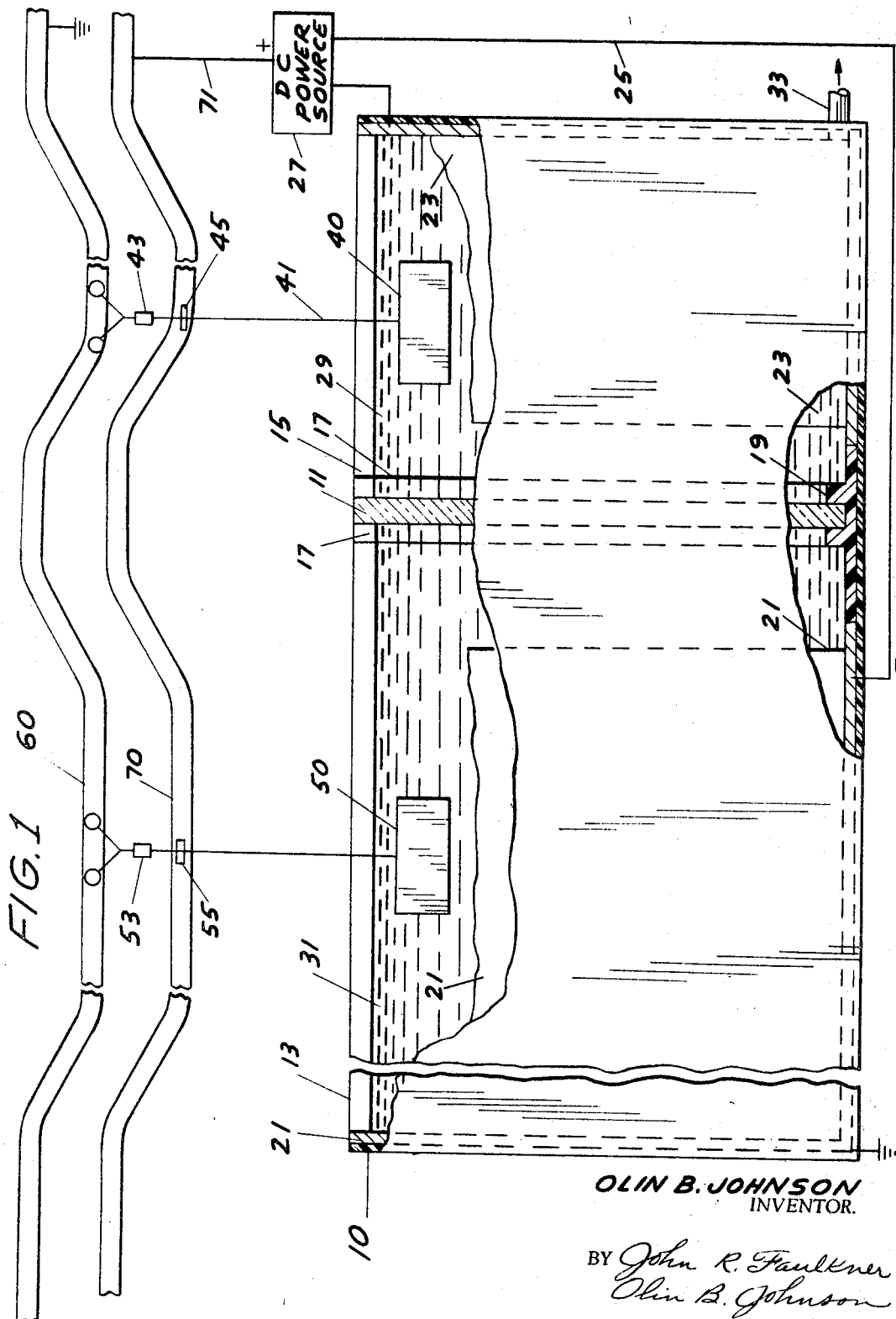
FIGURE 1 is a schematic side view of one embodiment of apparatus which can be used to carry out the instant invention.

Referring now to FIGURE 1, a nonconductive tank 10 is divided by an ionically conductive wall or membrane 11 into a coating compartment 13 and an ion removal and degasification compartment 15. Membrane 11 is supported on opposite sides of the ends thereof by supports 17 which effect a water-tight seal between the membrane 11 and tank 10. Membrane 11 is seated on and is in water-tight relationship with support member 19. Membrane 11 is ion permeable and/or ion conductive and prevents significant passage of coating material from compartment 13 to compartment 15. Membrane 11 may be a membrane of the type employed in dialysis or electrodialysis ion separation units, ion penetrable ceramic, etc. Electrodialysis of electrocoating bath is described by A. E. Gilchrist in U.S. patent application Ser. No. 440,583 filed Mar. 17, 1965, which disclosures are incorporated herein by reference.

Coating compartment 13 is substantially lined on three sides and bottom by a metal electrode 21 which serves as the cathode of the electrocoating cell. Compartment 15 is substantially lined on three sides and bottom by metal electrode 23 which serves as the cathode of the purification cell. Electrodes 21 and 23 are in electrical connection with a negative terminal of D.C. power source 27 via conductor 25 and with ground.

Compartment 13 contains an electrocoating bath 31 comprising an aqueous dispersion of an anodically depositable paint, said bath comprising water, a water soluble amine, e.g., diisopropanol amine, pigment and a pigment binder resin at least a major proportion of which is a polycarboxylic acid resin having an acid number of about 65 and an electrical equivalent weight of about 1500, e.g., a coupled glyceride drying oil reacted under substantially anhydrous conditions with about 2–25% of a polymerizable vinyl monomer and extended by blending it with a minor proportion of a non-heat reactive phenol-aldehyde resin at a temperature between about 200° and 260° C. for at least about 30 minutes.

Compartment 15 contains an aqueous bath 29 containing water and ions that have separated from coating bath 31 and passed into bath 29. Conduit 33 provides means whereby bath 29 of compartment 15 may be drained for periodic cleansing.

Metal articles 40 and 50 which are to be electropainted in compartment 13 are supported by conductor hangers 41 and 51 respectively. Hangers 41 and 51 are in turn suspended from and transported through baths 29 and 31 by a grounded conveyor 60. Conveyor 60 is a conventional, electrically powered, chain driven conveyor. Hangers 41 and 51 are separated from the conveyor by insulators 43 and 53 respectively to isolate plates or brushes 45 and 55 ride against and are shown in electrical connection with bus bar 70. Bus bar 70 is electrically connected to a positive lead of power source 27 via conductor 71.

As articles 40 and 50 move from right to left with respect to the drawing and enter bath 29, electrical potential is provided between each such article and electrode 23 which is in excess of the threshold voltage of the polycarboxylic acid resin in bath 31. In this embodiment, this difference of potential is the same difference of potential later employed between the article and electrode 21 to effect electrodeposition of paint in compartment 13. Gas is evolved from bath 29 and metallic ions within bath 29 are anodically deposited upon the metal article passing therethrough. Negative ions which can pass through membrane 11 are attracted into bath 29 while positively charged articles 40, 50, etc., are passing through bath 29. The article to be painted is controlled in its movement by the conveyor 60 and is raised from bath 29, over membrane 11, and enters coating bath 31.

The difference of electrical potential maintained between articles 40 and 50 and electrode 21 as the former pass through bath 31 is above the threshold voltage for the polycarboxylic acid resin of bath 31 under the conditions of temperature, bath conductivity, etc., then existing. Ordinarily, in industrial production, the voltage employed will be above about 50 volts, commonly in the range of about 100 to about 250 volts. Thus, in this embodiment negative ions are neutralized at the surface of the workpiece and may either deposit thereon or evolve as a gas as the case may be. Positive ions are neutralized at cathode 23.

EXAMPLE 2

Referring now to FIGURE 2, there is shown an electrocoating tank 101. Tank 101 is in electrical connection with a negative terminal of D.C. power source 105 via conductor 103 and with ground. Within tank 101 is an aqueous electrocoating bath 109. Passing through bath 109 and in the process of being painted is a metal object 111. Object 111 is in electrical connection with a positive terminal of D.C. power source 105 via conductor 113.

A conduit 115 provides means for withdrawing coating bath 109 from tank 101. This unseparated bath stream passes into compartment 119 of separation unit 117. Compartment 119 is defined on three sides and bottom by a watertight, nonconductive structure 121 and on a fourth side by an ion penetrable membrane 123. The major proportion of coating bath 109 entering compartment 119 from conduit 115 exits compartment 119 via conduit 125 and is recycled to tank 101. This cycling is effected by conventional pumping means not shown.

Ions pass from this stream through membrane 123 into compartment 127 either with or without significant water transfer depending upon the choice of membrane. Compartment 127 is defined on three sides and bottom by a metal structure 129 which serves as the cathode of the purification cell and is in electrical connection with a negative terminal of D.C. power source 105 via conductor 133 and with ground. The fourth side of compartment 127 is defined by membrane 123. Compartment 127 contains a water bath 131. An overflow conduit 135 provides means for recycling bath 131 into bath 109 in tank 101, e.g. by gravity flow. Positioned within bath 131 is an anode 137. Anode 137 is in electrical connection with a positive terminal of D.C. power source 105 via conductor 139.

In this embodiment the difference of electrical potential maintained between cathode 131 and anode 137 is independent of the difference of potential maintained between cathode 101 and anode 111, e.g. the potential employed for the purification cell may be in the range of about 20 to about 50 volts while the coating potential between cathode 101 and anode 111 may be, for example, 160 volts. The difference of potential between cathode 129 and anode 137 may be maintained at a constant level.

In one embodiment, this difference of electrical potential between the electrodes of the purification cell is intermittently effected in accordance with a predetermined pulse pattern which may include energizing of anode 137 for a predetermined period prior to entry of each workpiece into bath 109.

EXAMPLE 3

Referring now to FIGURES 3–6, there is shown a separation unit 201 comprising a tank 203 which includes a metal structure 205 and a nonconductive structure 207 in water-tight relationship. Membrane 209 divides tank 201 into a first compartment 211 and a second compartment 213. Conduit 215 provides inlet means into compartment 211 for a stream of electrocoating bath 211–1 introduced from the main electrocoating tank, not shown. Conduit 217 provides outlet means from compartment 211 whereby the major portion of the stream introduced via conduit 215 is recycled to the coating bath. Positioned within compartment 213 are a pair of brackets 219 and 221 which support idler rolls 223 and 225. Rolls 223 and 225 are constructed of plastic or other suitably insulative material. Positioned in the sides of tank 203 are a pair of slot-like openings 227 and 229 framed by insulators 231 and 233 respectively.

Compartment 213 contains a water bath 235. Slots 227 and 229 are above the water level in compartment 213 while rolls 223 and 225 are below such level.

A thin metal strip stock 237 is continuously moved through compartment 213 via slots 227 and 229 and is supported in bath 235 by rollers 223 and 225. Strip stock 237 is in electrical connection with the positive terminal of a D.C. power source 241 via conductor 239 and serves as the anode of the purification cell. Metal structure 205 is in electrical connection with D.C. power source 241 via conductor 243 and serves as the cathode of the purification cell.

In this embodiment the ions that deposit anodically are deposited on strip stock 237 and continuously removed from the system. This embodiment has a further advantage. If some waterborne coating material passes through the membrane or filter 209, such materials simply deposit upon the continuous anode and a clean portion of the anode enters continuously to accept ion neutralization. Conduit 245 provides means for introducing make-up water to the system. Conduit 247 provides means for recycling bath 235 back to the coating tank not shown.

In each of the foregoing embodiments, the coating material in the coating bath is periodically or continuously replaced as it is used up with replacement of the components thereof, i.e. binder resin, pigment, etc., being made in accordance with the ratio of their deposit. This ratio may vary considerably from the ratio of such components in the coating bath. Water is also added to the coating bath from time to time to maintain the paint solids level relatively constant, e.g. 5 percent.

In this application, "painting" by electrodeposition is meant to include the deposition of finely ground pigment and/or filler in the ionizable resin herein referred to as the binder, the deposition of binder without pigment and/or filler or having very little of same, but which can be tinted if desired, and the deposition of other water reducible surface coating compositions containing the binder which might be considered to be broadly analogous to enamel, varnish, or lacquer bases, and the coating material for such deposition is termed a "paint." Thus, the binder, which is converted to a water-resistant film by the electrodeposition and ultimately converted to a durable film resistant to conventional service conditions by final curing, can be all or virtually all that is to be deposited to form the film, or it can be vehicle for pigmentary and/or mineral filler material or even other resins on which it exerts the desired action for depositing the film. Suitable resins include but are not limited to those specifically listed in U.S. Patent 3,230,162 to A. E. Gilchrist. The preferred resins for anodic deposition have an acid number between about 30 and about 300 an an electrical equivalent weight between about 1,000 and about 20,000. The term "electrical equivalent weight" is employed herein to mean that amount of resin or resin mixture that will deposit per Faraday of electrical energy input. The conditions, procedures, and calculations which can be employed to determine electrical equivalent weight are set forth in detail in the aforementioned U.S. Patent 3,230,162.

EXAMPLE 4

A five-gallon bath of electrodepositable automobile primer paint is removed from an industrial production coating bath after the bath has undergone twenty turnovers. The aqueous bath has intimately dispersed therein a polycarboxylic acid resin, i.e. a coupled glyceride drying oil reacted under substantially anhydrous conditions with about 15 percent of a polymerizable vinyl monomer and extended by blending it with a minor proportion of a non-heat reactive phenol-aldehyde resin at a temperature of about 250° C. for about 1 hour, pigment, diisopropanol amine, and water. This material is placed in a coating tank and test panels are coated by anodic deposition as hereinbefore described with a potential difference between anode and cathode of about 150 volts. The panels are cured by conventional bake oven procedure and upon examination are found to have a relatively rough surface.

The bath is passed into contact with a membrane which admits of water seepage therethrough and prevents significant passage of the coating material, i.e. cellulosic fiber mat. While in contact with a first electrode, a continuous strip stock electrode is passed through the aqueous material separated from the bath and a potential of about 30 volts is maintained between the two electrodes with the strip stock serving as the anode. This procedure is continued overnight with the separated aqueous material continuously recycled to the coating bath. A test panel is then inserted in the bath and coated at about 150 volts. This film is cured in the same manner as that of the first test panel and examined. A decrease in roughness of the coated surfaces is observed relative to the first test panel.

The foregoing examples are solely for purposes of illustration and should not be considered as limitations upon the true scope of the invention as set forth in the appended claims.

1. In a method for painting an electrically conductive object in an aqueous coating bath with an electrodepositable paint comprising an organic resin having ionized sites thereon and intimately dispersed within said bath, said method comprising immersing said object within said bath, utilizing said bath as the aqueous electrolyte and said object as a first electrode of an electrical circuit comprising said bath, said first electrode, and a second electrode in contact with said bath and spaced apart from said object, providing a difference of electrical potential between said first electrode and said second electrode sufficient to cause a direct current of electrical energy through said bath and between said first electrode and said second electrode having direction and sufficiency to effect electrodeposition of a coating of said resin upon said object, and removing the resultant coated object from said bath and wherein said bath accumulates an increasing concentration of ionized inorganic materials with continued use, the improvement which comprises separating said plant from a remainder of said bath, placing said remainder in contact with and between a cathode and an anode, and maintaining a difference of electrical potential between said cathode and said anode which is above the potential required to effect electrodeposition of said resin and returning the thus treated remainder to said bath.

2. The method of claim 1 wherein the difference of electrical potential is above about 20 volts.

3. The method of claim 1 wherein the difference of electrical potential between said anode and said cathode is essentially the same as the difference of electrical potential between said first electrode and said second electrode.

4. The method of claim 1 wherein said difference of electrical potential between said anode and said cathode is intermittently effected and said difference of electrical potential is maintained for a predetermined period prior to entry of each object to be coated into said electrical circuit.

5. The method of claim 1 wherein a portion of said bath is continuously removed from said electrical circuit, passed to a separation unit spaced apart from said coating bath wherein paint of said portion is separated from a remainder of said portion and returned to said coating bath in said electrical circuit, said remainder is placed in contact with and between a cathode and an anode between which a difference of electrical potential in excess of about 20 volts is maintained, and recycling said remainder to said bath in said electrical circuit.

6. The method of claim 5 wherein one electrode of the group consisting of said anode and said cathode is a strip of metal that extends through said separation unit and moves through said remainder while said difference of electrical potential is maintained between said anode and said cathode.

References Cited

UNITED STATES PATENTS

| | | | |
|---|---|---|---|
| 3,355,373 | 11/1967 | Brewer et al. | 204—181 |
| 3,355,374 | 11/1967 | Brewer et al. | 204—181 |

JOHN H. MACK, *Primary Examiner.*

H. M. FLOURNOY, *Assistant Examiner.*

U.S. Cl. X.R.

204—131